Nov. 12, 1946.   R. A. MILLER   2,410,990
RAT TRAP
Filed Dec. 8, 1942   2 Sheets-Sheet 1
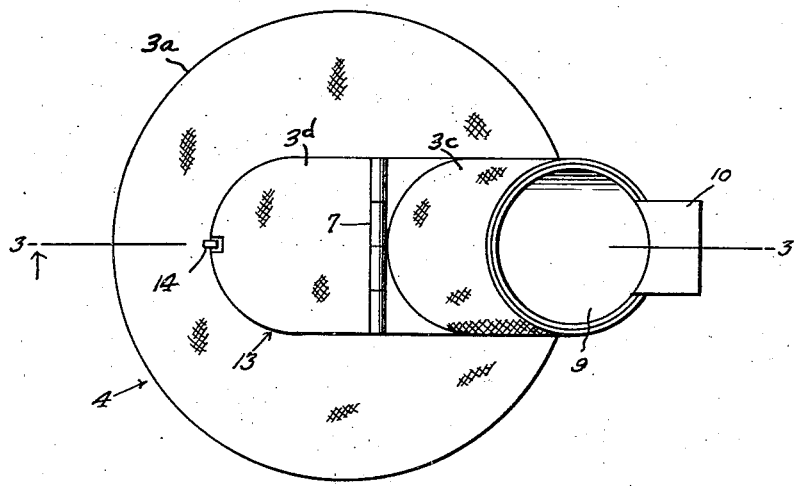
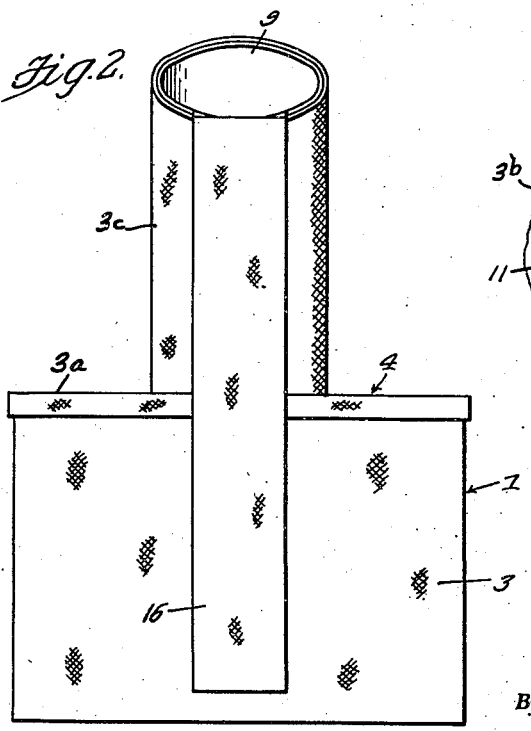
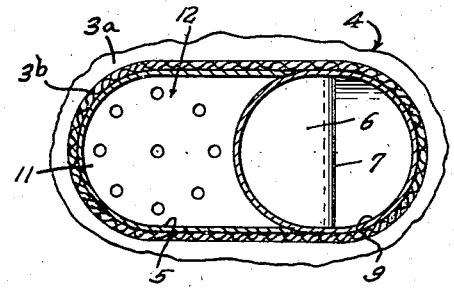
Inventor
Richard Allen Miller
By Clarence A. O'Brien
and Harvey B. Jacobson
Attorneys Nov. 12, 1946. R. A. MILLER 2,410,990
RAT TRAP
Filed Dec. 8, 1942 2 Sheets-Sheet 2
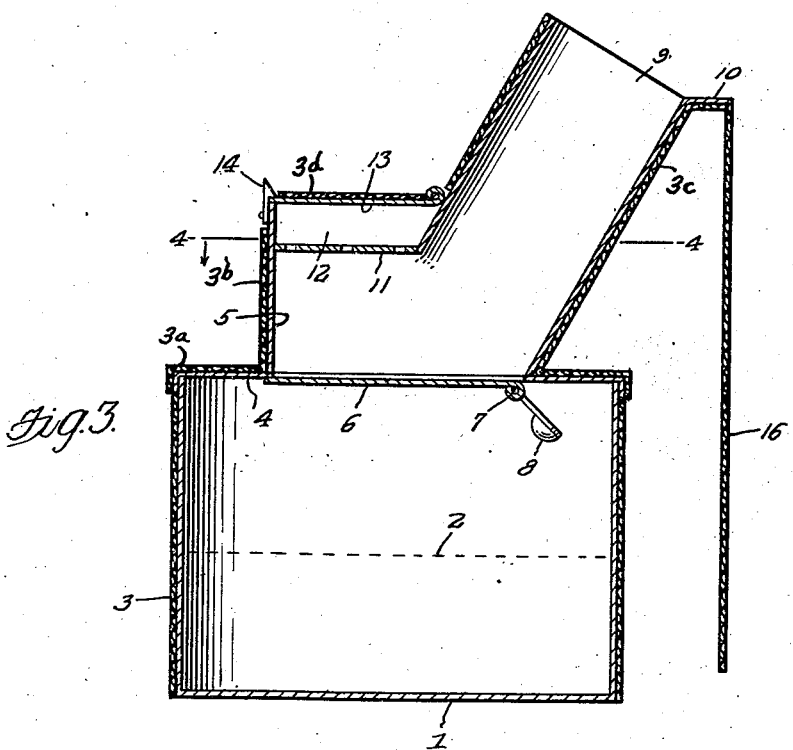
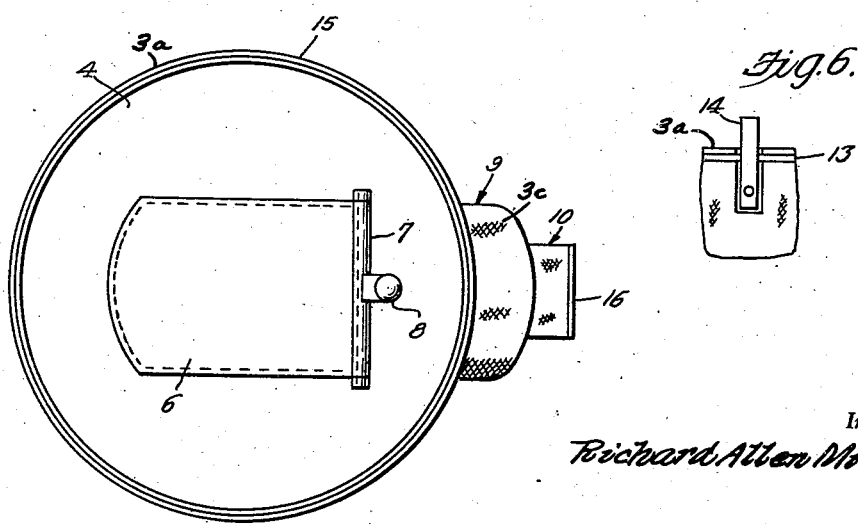
Inventor
Richard Allen Miller
By Clarence A. O'Brien
and Harvey B. Jacobson
Attorneys Patented Nov. 12, 1946

2,410,990

UNITED STATES PATENT OFFICE 2,410,990

RAT TRAP

Richard Allen Miller, Milford, Va.

Application December 8, 1942, Serial No. 468,267

2 Claims. (Cl. 43—69)

The present invention relates to new and useful improvements in rat traps of the type which are adapted to lure the rats thereinto and then drown said rats.

An important object of the invention is to provide, in a manner as hereinafter set forth, a rat trap of the aforementioned character comprising a non-return entrance of a novel construction and arrangement.

Other objects of the invention are to provide a rat trap of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a rat trap constructed in accordance with the present invention.

Figure 2 is a view in front elevation of the device.

Figure 3 is a vertical sectional view, taken substantially on the line 3—3 of Figure 1.

Figure 4 is a view in horizontal section, taken substantially on the line 4—4 of Figure 3.

Figure 5 is a bottom plan view of the cover.

Figure 6 is a detail view in elevation, showing the latching means for the hinged bait compartment closure.

Referring now to the drawings in detail, it will be seen that the embodiment of the invention which has been illustrated comprises a circular container 1 of suitable dimensions and material. The container 1 is to be filled with water to any suitable level, as at 2. The walls of the container 1 are provided with a burlap covering 3.

Removably mounted on the container 1 is a lid 4 provided with a burlap covering 3a. Rising from the lid 4 is a chamber 5 for communication with the container 1 and having a burlap covering 3b. A platform 6 is hinged at 7 for swinging movement in a vertical plane on the lid 4 for controlling communication between the chamber 5 and the container 1, said platform constituting the bottom of said chamber. A counterweight 8 on the hinged end of the platform 6 swings said platform upwardly to closed position.

Extending upwardly at an inclination from one side portion of the chamber 5 and communicating therewith is a tube 9 having a burlap covering 3c. A lip 10 projects horizontally from the upper end of the tube 9.

A perforated horizontal partition or plate 11 provides a bait box or compartment 12 in the upper portion of the chamber 5. This bait compartment 12 is provided, on its top, with a hinged closure 13 having a burlap covering 3d. A latch 14 releasably secures the closure 13 in closed position.

The burlap coverings offer a good foothold and permit the rats to mount the trap without necessarily using the ladder 16. Formed integrally with the covering 3c is a tap constituting the flexible ladder 16 which is suspended from the lip 10 on the upper end of the tube 9.

It is thought that the operation of the trap will be readily apparent from a consideration of the foregoing. Briefly, suitable bait is placed in the compartment 12 after the container 1 has been filled to the desired level with water and the lid 4 mounted on said container. Rats in the vicinity of the trap are attracted thereto by the scent of the bait in the compartment 12. The rats, in attempting to secure access to the bait, are lured up the ladder 16, enter the inclined tube 9 and descend. The weight of a rat on the tilting platform 6 is sufficient to overcome the counterweight 8, thereby swinging said platform downwardly for depositing the rat in the container where it is drowned in the water. The platform 6 is then returned to its closed position beneath the lid 4 by the counterweight 8 and the trap is ready for the next operation. To empty the trap it is only necessary to remove the lid 4 from the container 1.

It is believed that the many advantages of a rat trap constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

1. A rat trap of the character described comprising a water container having a removable top lid provided with a central opening, a chamber rigid with and rising from the lid in surrounding relation to said opening, an entrance tube rigid with and extending upwardly from said chamber at one side of the latter, said tube being inclined upwardly and outwardly beyond one side of the container and having an outwardly projecting lip at its upper end, bait-holding means in the upper portion of said chamber at the opposite side thereof from said tube, a platform hinged to the lid at the side remote from the bait holding means and weighted at its hinged side to swing upwardly for normally closing said opening, and a flexible cloth ladder vertically suspended from said lip, said lid, chamber and tube being removable as a unit from the water container.

2. A rat trap of the character described comprising a water container having a removable top lid provided with a central opening, a chamber rigid with and rising from the lid in surrounding relation to said opening, an entrance tube rigid with and extending upwardly from said chamber at one side of the latter, said tube being inclined upwardly and outwardly beyond one side of the container and having an outwardly projecting lip at its upper end, bait-holding means in the upper portion of said chamber at the opposite side thereof from said tube, a platform hinged to the lid at the side remote from the bait holding means and weighted at its hinged side to swing upwardly for normally closing said opening, a flexible cloth ladder vertically suspended from said lip, and a cloth covering on the outer surfaces of the container, the lid, the chamber and the entrance tube, said lid, chamber and tube being removable as a unit from the water container.

RICHARD ALLEN MILLER.